United States Patent [19]

Fuller et al.

[11] Patent Number: 5,768,605
[45] Date of Patent: Jun. 16, 1998

[54] METHOD AND APPARATUS FOR POWER MANAGEMENT OF A PCMCIA CARD

[75] Inventors: Ron Fuller, Tigard; Nelson Yaple, Aloha, both of Oreg.

[73] Assignee: Itel Corporation, Santa Clara, Calif.

[21] Appl. No.: 603,500

[22] Filed: Feb. 20, 1996

Related U.S. Application Data

[63] Continuation of Ser. No. 213,551, Mar. 16, 1994, abandoned.

[51] Int. Cl.⁶ .................................................. G06F 7/10
[52] U.S. Cl. ........................................... 395/750.06
[58] Field of Search .......................... 395/750, 750.06; 364/707

[56] References Cited

U.S. PATENT DOCUMENTS

| | | | |
|---|---|---|---|
| 4,841,133 | 6/1989 | Gercekci et al. | 235/492 |
| 5,167,024 | 11/1992 | Smith et al. | 395/375 |
| 5,183,404 | 2/1993 | Aldous et al. | 439/55 |
| 5,230,074 | 7/1993 | Canova, Jr. et al. | 395/750 |
| 5,303,171 | 4/1994 | Belt et al. | 364/707 |
| 5,408,669 | 4/1995 | Stewart et al. | 395/750 |

*Primary Examiner*—Jack B. Harvey
*Assistant Examiner*—Paul R. Myers
*Attorney, Agent, or Firm*—Blakely, Sokoloff, Taylor & Zafman

[57] ABSTRACT

A communications card for use with a computer system that provides a system for reducing unnecessary power consumption. When the system is enabled, the card prevents the computer system from detecting insertion of the card until cable necessary for communication is connected to the card. Once a cable is connected, two nodes within the card are coupled together allowing the computer system to detect the presence of the card. The computer system then activates the card by applying power thereto.

4 Claims, 3 Drawing Sheets

METHOD AND APPARATUS FOR POWER MANAGEMENT OF A PCMCIA CARD

This is a continuation of application Ser. No. 08/213,551, filed Mar. 16, 1994, now abandoned.

BACKGROUND OF THE INVENTION

1. Field of the Invention

The described invention relates generally to computer systems and in particular to plug-in communication cards for use with laptop computers.

2. Related Art

A common method for installing "add-on" hardware components into a computer system involves opening the casing of the computer system, and placing the card or hardware component into a slot or pin grid. Various developments within the computer industry, however, have made this method inconvenient for the user in some instances. These developments include the need to perform numerous and rapid changes between the various hardware components installed, and the introduction of portable or laptop computers which usually cannot be disassembled and then reassembled easily. To eliminate these inconveniences the Personal Computer Memory Card International Association (PCMCIA) interface was established which provides a standard for incorporating hardware components into computer systems without opening the casing of the computer. Hardware components that are configured with the proper electrical and physical requirements merely need to be inserted into slots that are accessible from outside the computer casing in order to be installed into the system.

The standardized PCMCIA cards are approximately the size of a credit card and include a connector which mates with a corresponding connector in the computer. The PCMCIA standard includes a type I format, a type II format and a type III format, each format being distinguished by a different card thickness. A type I card is approximately 3.3 millimeters thick, a type II card is approximately 5.0 millimeters thick and a type III card is approximately 10.5 millimeters thick. Each computer that conforms with the PCMCIA specification will contain slots that can receive a standardized card. Both the type I and II cards occupy a single slot, while the type III card occupies two slots. Each computer slot contains a 68 pin connector that is typically mounted to a motherboard to provide an interconnect to the computer system. A copy of the PCMCIA standard can be obtained by writing to the Personal Computer Memory Card International Association at 1030 G East Duane Avenue, Sunnyvale, Calif. 94086.

Although the words represented by the acronym PCMCIA include "memory", almost any type of component may be incorporated into a computer system in the form of a PCMCIA card. One category that has become popular is communication cards, which include modem cards and local area network (LAN) cards. To provide functionality, these cards must be connected to a means for communicating with another computer system. These means for communication can include telephone cords, LAN connection media, and cellular telephone connections. When a connection to one of these means for communication is not present, the communication cards provide little or no additional functionality to the computer system.

The PCMCIA standard calls for power to be applied to a card at all times while the card is inserted in the host computer system. This causes communication cards to consume power even while disconnected from a means for communication and therefore not capable of providing any usefulness to the system. Since the PCMCIA interface is frequently utilized within a laptop computer, which often runs from a battery, this unnecessary power consumption is especially problematic. While removing the card from the PCMCIA slot would eliminate the unnecessary power consumption, this solution is not ideal because leaving the communication card in the PCMCIA slot for storage purposes is often desirable to ensure that the card will be present when a connection to a means for communication becomes available. Thus, a communication card that only consumes power when a means for communication is connected is desirable. Additionally, having that card comply with PCMCIA standards is also desirable to ensure that it will interface properly with computer systems from various vendors.

BRIEF SUMMARY OF THE INVENTION

The described invention provides a method and apparatus for introducing communication or network capability into a computer system that limits unnecessary power consumption and that remains compatible with the PCMCIA standard for providing additional capability to a computer system.

In accordance with one aspect of the invention a PCMCIA communication card having two connect notification nodes is provided. When no means for communication is connected to the PCMCIA communication card, the two connect notification nodes remain uncoupled and no power is applied to the card. Once a means for communication is connected the two connect notification nodes are coupled together causing power to be applied to the PCMCIA communication card so that it can begin operation.

In a preferred embodiment of the invention the means for communication is a cable connector that is inserted into a slot located in the PCMCIA communication card. The cable connector is configured to electrically couple at least two pins in the slot together when inserted. These two pins are coupled to the connect notification nodes so that when the connector is inserted power is applied to the PCMCIA communication card. This reduces the amount of unnecessary power consumption by causing power to be applied to the PCMCIA card only when a means for communication is connected.

DETAILED DESCRIPTION OF THE INVENTION

Figure 1:
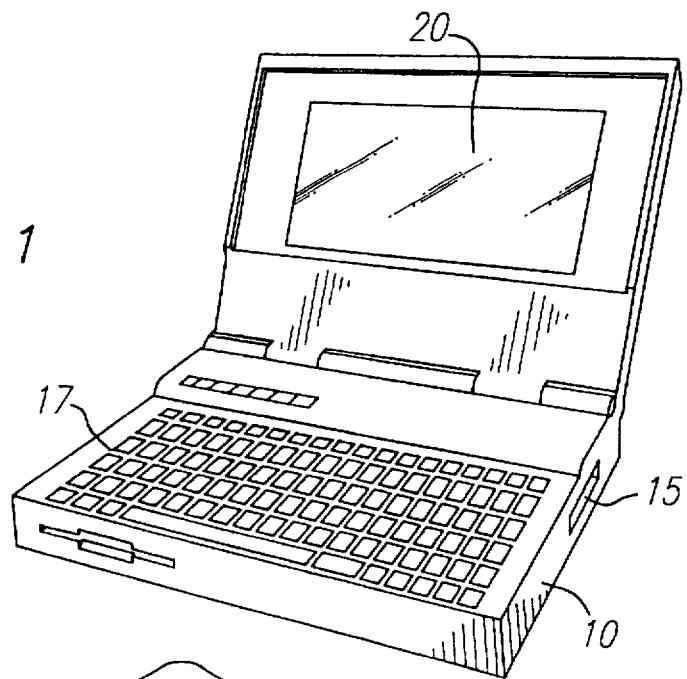
FIG. 1 is a perspective illustration of a laptop computer system.

FIG. 1 is an illustration of a computer system 10 configured with a cavity 15 on one side. At least one PCMCIA slot is located within cavity 15 which can be accessed without opening computer system 10. The system shown is a laptop or portable computer with a screen 20 and a keyboard 17 built in. While cavity 15 is shown on one side of computer system 10, other locations are acceptable. The system includes a battery so that it can be used when no other power source is conveniently available.

Figure 2A:
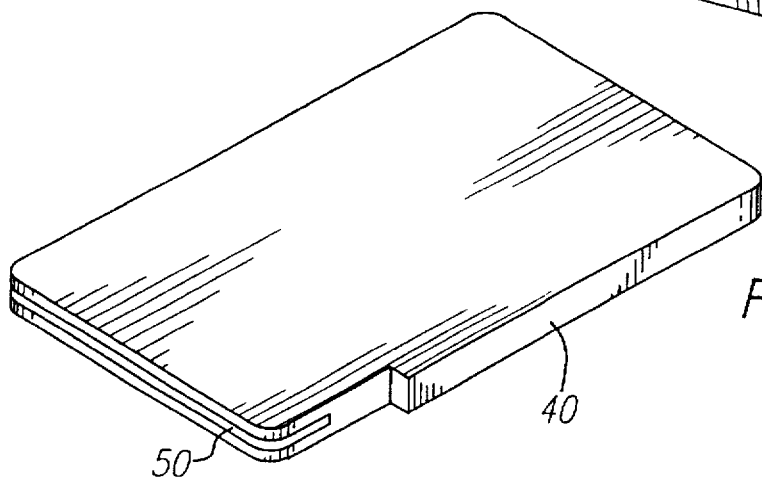
FIG. 2a is a first perspective illustration of a PCMCIA communication card showing a sixty-eight pin PCMCIA male connector.
Figure 2B:
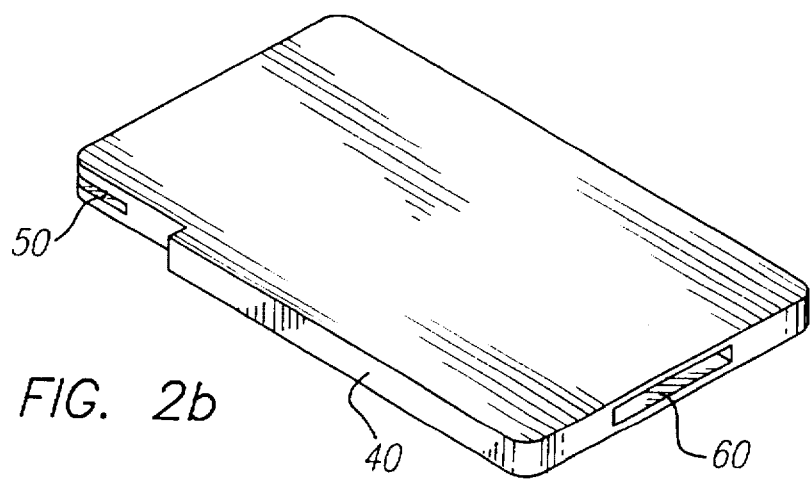
FIG. 2b is a second perspective illustration of the PCMCIA communication card of FIG. 2a showing a communication slot.

FIG. 2a is an illustration of a PCMCIA communication card 40. A sixty-eight contact male connector 50 shown at a front end of the card is provided for plugging the card into a PCMCIA slot. When incorporated into computer system 10 the front end of the card is inserted into cavity 15. FIG. 2b is an illustration of PCMCIA communication card 40 also showing a communication connection slot 60 located at a back end of the card opposite the front end having pins 50. In a preferred exemplary embodiment wherein the PCMCIA card is a fax/modem card, the connection in slot 60 contains fourteen contacts. However, an alternative design using a different number of pins is also possible.

Figure 3:
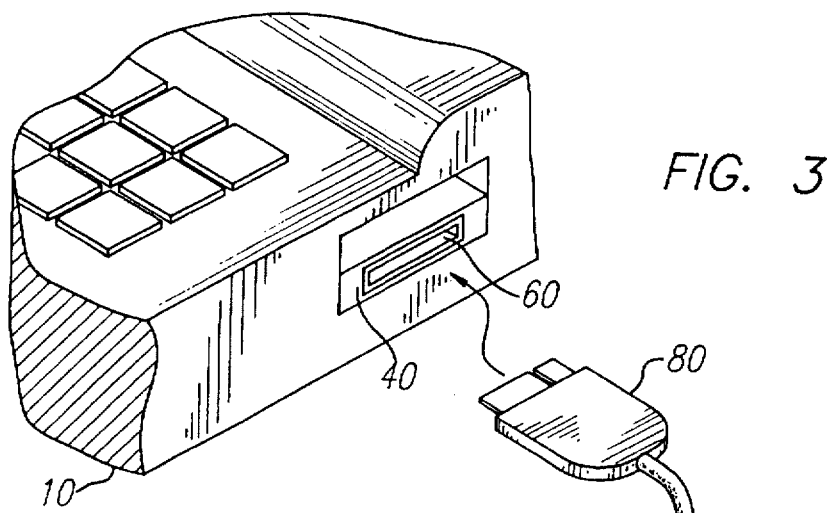
FIG. 3 is an illustration of the laptop computer system of FIG. 1 with a PCMCIA communication card inserted and a cable connector ready for insertion into the PCMCIA communication card.

FIG. 3 is a enlarged view of cavity 15 of computer system 10 with PCMCIA communication card 40 inserted. In this configuration, communication slot 60 in the card is accessible from the computer system so that a cable connector may be inserted into slot 60. In the preferred embodiment, the outer edge of PCMCIA communication card 40 fits within a cavity in the computer and is nearly flush with the side wall of computer 10. The use of cavity 15 is not necessary, however, the use of such a cavity has the advantage of minimizing the additional space taken up when the card is inserted.

Figure 4:
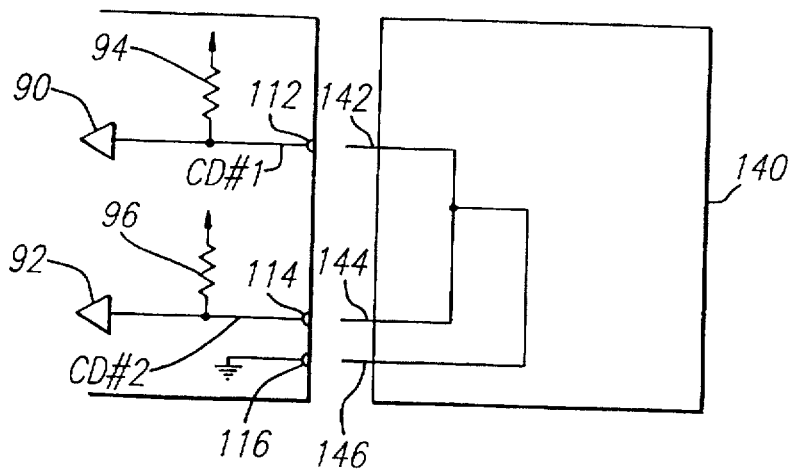
FIG. 4 is a circuit diagram illustrating a prior art PCMCIA card and a mechanism used to detect the insertion of the PCMCIA communication card into a computer system.

FIG. 4 is a circuit diagram that illustrates the mechanism as set forth by the PCMCIA standard for a computer system to detect the presence of a PCMCIA card, and is also an example of the prior art. Contacts 112 and 114 are two of the sixty-eight contacts contained in the PCMCIA slot connector, and are coupled to nodes CD#1 and CD#2. Computer system 10 is configured to monitor nodes CD#1 and CD#2 using op-amps 90 and 92 and to not apply power to any power contacts within the PCMCIA slot connector until the nodes go logic low. Resistors 94 and 96 have a resistance of 10,000 ohms. Configuring computer system 10 in this manner puts it in compliance with the PCMCIA standard.

PCMCIA card 140 is shown with contacts 142 and 144 coupled to contact 146. When the card is inserted into the PCMCIA slot connector contact 142 is coupled to contact 112, contact 144 is coupled to contact 114, and contact 146 is coupled to contact 116. This couples nodes CD#1 and CD#2 to ground through the PCMCIA card 140, causing them to go logic low. When computer system 10 detects that these nodes have gone logic low it applies power to the PCMCIA card through the power contacts within the PCMCIA slot connector, activating PCMCIA card 140. Contacts 112 and 114 correspond to pin numbers 36 and 37 under the PCMCIA standard and are placed near the edges of the slot connector to ensure the PCMCIA card has completely and evenly been inserted.

Figure 5:
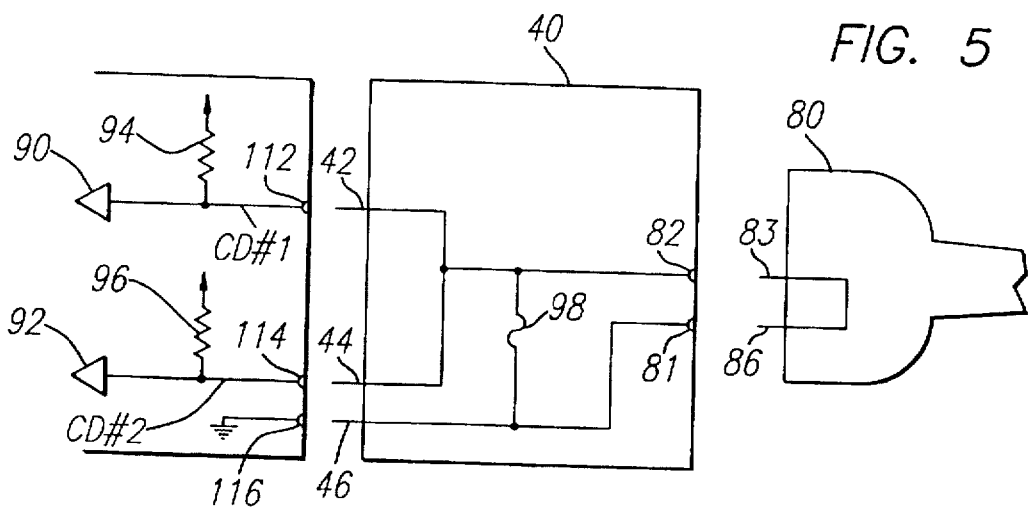
FIG. 5 is a circuit diagram illustrating the PCMCIA communication card of FIG. 2a which is configured in accordance with an embodiment of the invention.

FIG. 5 is a circuit diagram of PCMCIA card 40 and cable connector 80 configured in accordance with a preferred embodiment of the invention. When PCMCIA card 40 is inserted into computer system 10 contacts 112, 114, and 116 are coupled to contacts 42, 44, and 46 respectively. Contacts 42 and 44 are coupled to 2MA fuse 98 which is coupled to contact 46 and contact 82. Contact 81 is also coupled to contact 46. When it is desirable to have PCMCIA card 40 function in a manner consistent with the prior art, fuse 98 remains configured as shown. However, if it is desirable to have PCMCIA card 40 reduce unnecessary power consumption fuse 98 is blown by applying sufficient current between nodes 82, 44 or 42 and nodes 46 or 81 to blow the fuse 98, eliminating the connection from nodes 42 and 44 to ground through fuse 98. In another preferred embodiment a zero ohm resistor is put in place of fuse 98. The resistor is cut or removed when reduction of power consumption is desired. Alterations to the fuse or resistor would normally take place before the card is provided to the end user.

When PCMCIA card 40 is configured with fuse 98 blown, insertion of the card does not couple nodes CD#1 and CD#2 to ground. Unless these nodes are coupled to ground, computer system 10 will not detect the insertion of PCMCIA communication card 40 and therefore will not apply power to PCMCIA communication card 40. This is desirable because PCMCIA card 40 provides no real functionality without being coupled to cable connector 80 or other means for communicating with another system.

Still referring to FIG. 5, cable connector 80 is shown configured in accordance with a preferred embodiment of the invention. Contacts 83 and 86 are shown coupled together. In the modem card embodiment these are contacts 7 and 8 of the fourteen contact cable connector 80. Contact 83 will be coupled to contact 82 when cable connector 80 is inserted into communication slot 60, and contact 86 will be coupled to contact 81. If PCMCIA communication card 40 is already inserted into the PCMCIA slot in computer system 10, inserting cable connector 80 will couple CD#1 card CD#2 to ground through the cable connector and PCMCIA card 40, causing computer system 10 to "detect" the presence of the PCMCIA card 40. Computer system 10 will then activate PCMCIA card 40 by applying power to the card. Causing computer system 10 to apply power only when the card 40 is in place and connector 80 is inserted achieves the goal of having PCMCIA communication card 80 consume power only when a means for communication is connected. Other contacts are also connected to contact 83 and 86 in the cable used with the modem card embodiment of PCMCIA card 40, but these other contacts are not pertinent to the invention.

Figure 6:
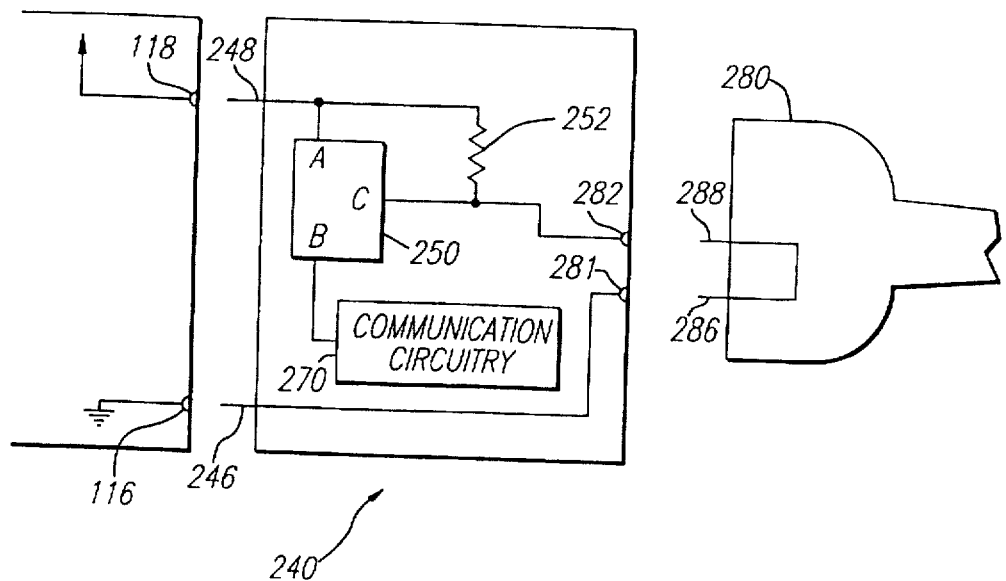
FIG. 6 is a circuit diagram illustrating the PCMCIA communication card of FIG. 2a which is configured in accordance with a second embodiment of the invention.

FIG. 6, is a circuit diagram illustrating a second embodiment of the invention. In this embodiment contact 248 of PCMCIA communication card 240 is connected to node A of switch 250 and to resistor 252. Node B of switch 250 is coupled to communication circuitry 270. Node C of switch 250 is coupled to contact 282 of the communication slot of PCMCIA card 240, and to resistor 252. Cable connector 280 is configured similarly to that shown in FIG. 5. Within computer system 10 contact 118 is coupled to the power supply, and contact 16 is coupled to ground. Only when a logic low is placed on node C of switch 250 are nodes A and B electrically coupled together.

When PCMCIA communication card 240 is inserted into the PCMCIA slot of computer system 10 contact 248 is coupled to contact 118 and contact 246 is coupled to contact 116. The voltage from the power supply is applied to node C of switch 250 by resistor 252 causing it to go logic high. This decouples the communications circuitry 270 from the power supply at node A, and therefore reduces or limits the amount of power consumed by PCMCIA communication card 240. When cable connector 280 is inserted into the communication slot 60 of PCMCIA communication card 240, contact 288 is coupled to contact 282 and contact 286 is coupled to contact 281 causing node C of switch 250 to be coupled to ground through communication cable 280. This places node C of switch 250 in a logic low. When node C is logic low switch 250 couples node A to node B causing power to be applied to communication circuitry 270.

Figure 7:
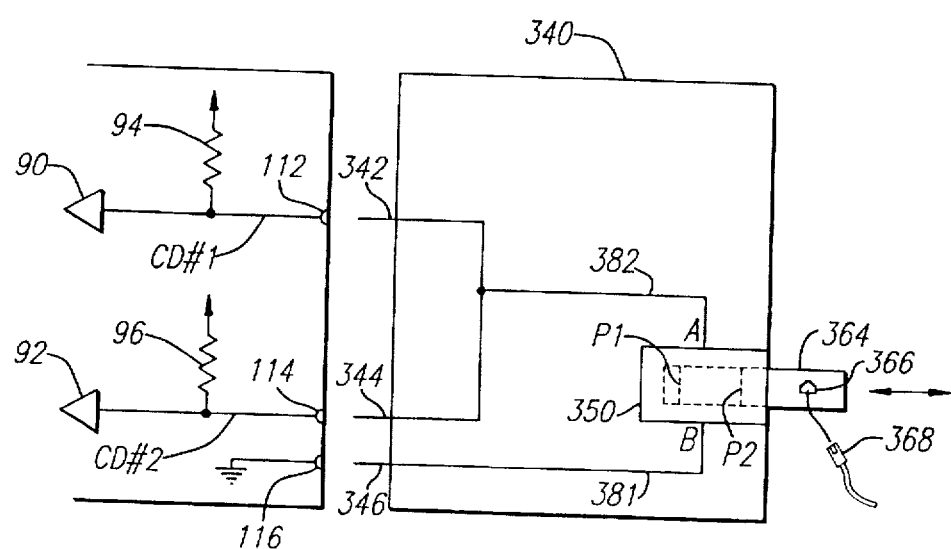
FIG. 7 is a circuit diagram illustrating the PCMCIA communication card of FIG. 2a which is configured in accordance with a third embodiment of the invention.

FIG. 7 is a circuit diagram illustrating a third embodiment of the invention. Within PCMCIA communication cards 340, node A of switch 350 is coupled to contacts 342 and 344, and node B of switch 350 is coupled to contact 346. Retractable communication coupler 364 is connected to switch 350. Retractable communication coupler 364 can assume position P1, indication by the dashed line, and position P2, indicated by the shown position of the retractable communication coupler. When retractable communication coupler 364 is in position P1, switch 350 decouples node A from node B. When retractable communication coupler 364 is in position P2, node A and B are coupled together. Cable 380 is inserted in connector 366 to couple PCMCIA card 340 to a means for communication such as a phone network.

When PCMCIA card 340 is inserted into the PCMCIA slot of computer system 10 contact 342 is coupled to contact 112, contacts 344 is coupled to contact 114, and contact 346 is coupled to contact 116. When retractable communication connector 364 is in position P1 no cable connector or other means for communication can be connected to PCMCIA card 340. Switch 350 therefore acts to decouple card detect nodes CD#1 and CD#2 from ground 116 that power is not applied to PCMCIA communication card 340. When retractable communication connector 364 is in position P2 a means for communication such as a telephone wire can be coupled to PCMCIA communication card 340, and therefore switch 350 couples node A to node B allowing computer system 10 to detect the presence of the card.

An advantage of the described invention is that no special modification of the PCMCIA slot within computer system 10 is required. PCMCIA is a standard and therefore modifications are avoided to ensure that computer systems and hardware devices manufactured by different companies can be used interchangeably. The invention allows PCMCIA communication card 40 to be configured in complete compliance with the PCMCIA standard by not blowing fuse 98. If the fuse is blown the invention achieves power savings by using the normal detection method to postpone the detection of the insertion of the card by the computer system until cable connector 80 is inserted into communication slot 60. Using the normal method of detecting card insertion as defined under the PCMCIA standard removes any need to alter the PCMCIA slot in computer system 10. By allowing PCMCIA communication card 40 to completely comply with PCMCIA standards, or to incorporate a power saving capability that can be used with a system complying with PCMCIA guidelines, the ability of the invention to be utilized with numerous computer system is assured.

Connector cable 80 can be connected to various means for communication. In one preferred embodiment cable 80 is connected to a standard analog phone line. Such is the case when PCMCIA card 40 is a modem card. In another preferred embodiment cable connector 80 is coupled to a local area network. This is the case when PCMCIA card 40 is a LAN card. In another preferred embodiment, cable connector 80 is connected to an ethernet cable connected to an ethernet network. This is the case when PCMCIA card 40 is an ethernet card. In still another preferred embodiment, cable connector 80 is connected an antenna. This is the case when PCMCIA card 40 is a cellular telephone transmitter and receiver or other radio based means for communication. In each of the cases described, the coupling of PCMCIA card 40 to cable connector 80 creates the connection to a means for communication with another system and therefore allows PCMCIA card 40 to provide useful functionality to computer system 10, yet only when this connection is established is power applied to PCMCIA card 40.

Thus, a method and apparatus for providing communication capability to a computer system using a PCMCIA card that only consumes power when a means for communication is connected has been disclosed. It will be apparent to one skilled in the art that various embodiments of the invention are possible other than the one specifically disclosed. In general, the exemplary embodiment described herein is merely illustrative of the invention and should not be taken as limiting the scope of the invention.

What is claimed is:

1. A communication card having a first side and a second side comprising:
   a first plurality of contacts situated on the first side to interconnect with at least one card detect node and a reference node of a Personal Computer Memory Card International Association (PCMCIA) slot upon insertion into the PCMCIA slot;
   a second plurality of contacts situated on the second side to receive a connector; and
   a circuit interconnecting the first plurality of contacts to the second plurality of contacts, the circuit including
      a first circuit line interconnecting a first contact of the first plurality of contacts to a first contact of the second plurality of contacts,
      a second circuit line interconnecting a second contact of the first plurality of contacts to a second contact of the second plurality of contacts, and
      a fuse interconnected between the first circuit line and the second circuit line, the fuse, when blown, disconnects the first circuit line from the second circuit line in order to preclude the communication card from drawing power until insertion into the PCMCIA slot and connection of the connector to the second plurality of contacts.

2. The communication card of claim 1, wherein the fuse, when intact, establishes an interconnection between the first circuit line and the second circuit line to enable the communication card to draw power when inserted into the PCMCIA slot.

3. A computer system comprising:
   an external communication device having a connector cable;
   a slot having a connector including at least one card detect contact and a ground contact; and
   a communication card adapted for insertion into the slot, the communication card includes
      a first contact coupled to the at least one detect contact upon inserting the communication card into the slot,
      a second contact coupled to the ground contact upon inserting the communication card into the slot, and
      a circuit electrically connecting the first contact to the second contact to apply power to the communication card only when the connector cable is coupled to the communication card and the communication card is inserted into the slot, the circuit including a first circuit line interconnecting the first contact of the communication card to a first contact of the connector cable, a second circuit line interconnecting the second contact of the communication card to a second contact of the connector, cable and a fuse interconnected between the first circuit line and the second circuit line, the fuse, when blown, disconnects the first circuit line from the second circuit line in order to preclude the communication card from drawing power until insertion into the slot and connection of the connector cable to the first and second circuit lines.

4. The computer system of claim 3, wherein the fuse of the communication card, when intact, establishes an interconnection between the first circuit line and the second circuit line to enable the communication card to draw power when inserted into the slot.

* * * * *